Oct. 2, 1928.
W. W. SMITH ET AL
1,685,964
ELECTRIC TORSION POWER METER
Filed July 22, 1924    3 Sheets-Sheet 1
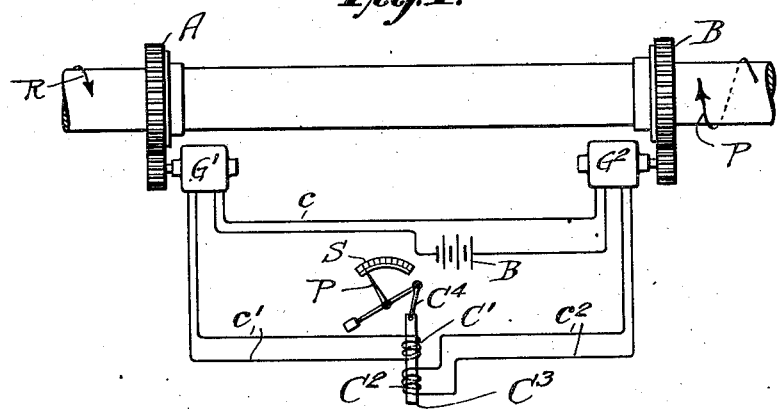
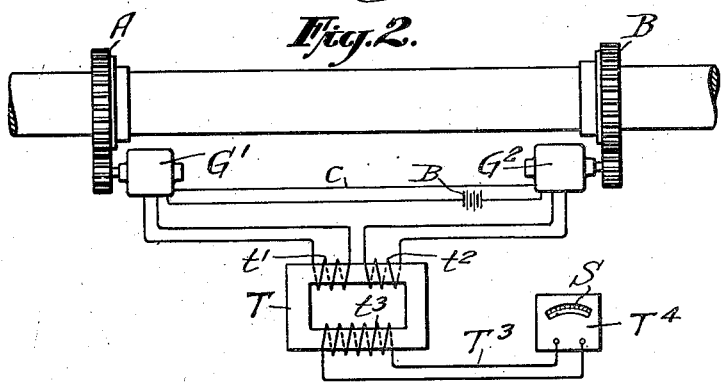
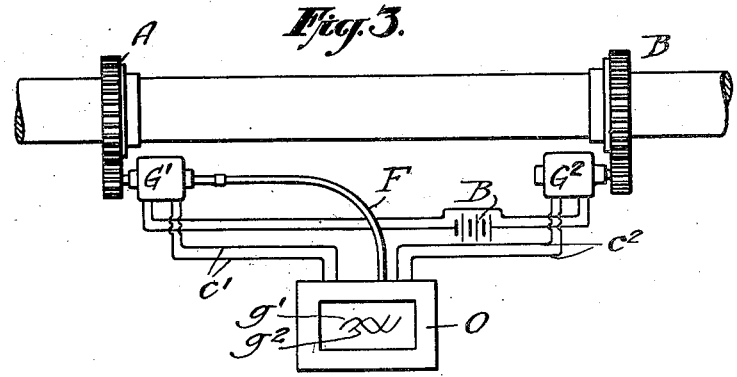
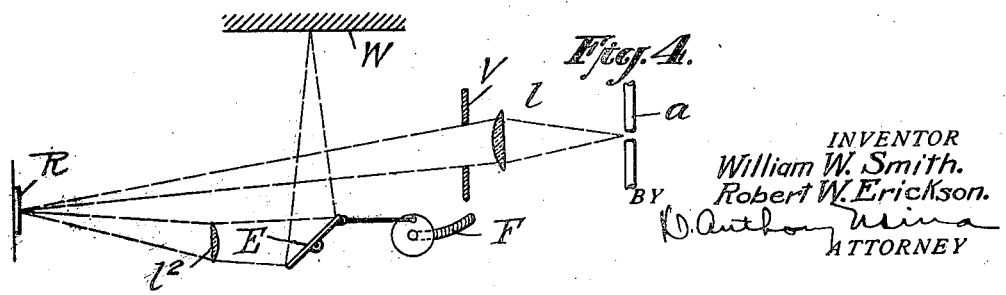
INVENTOR
William W. Smith.
Robert W. Erickson.
BY
ATTORNEY Oct. 2, 1928.

W. W. SMITH ET AL 1,685,964

ELECTRIC TORSION POWER METER

Filed July 22, 1924     3 Sheets-Sheet 2

INVENTORS
William W. Smith.
Robert W. Erickson.
BY
ATTORNEY

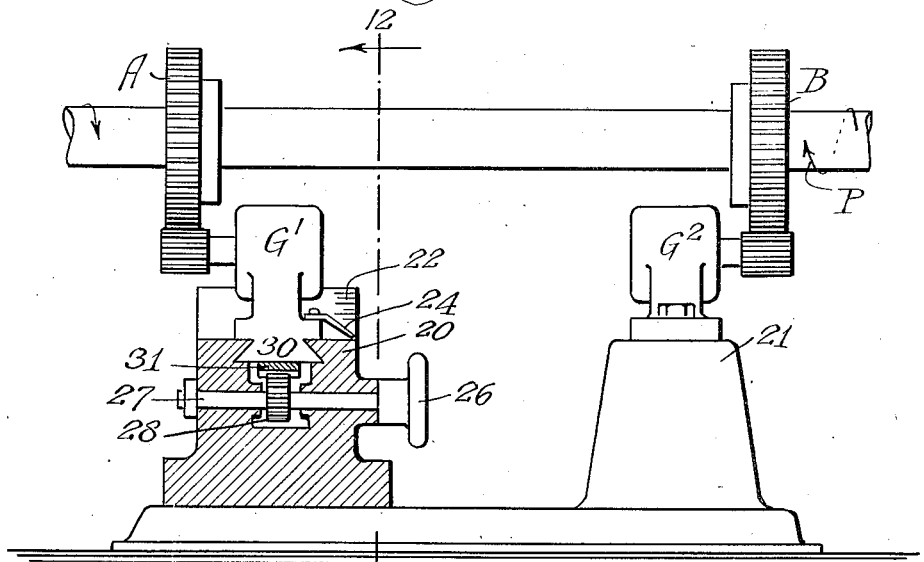
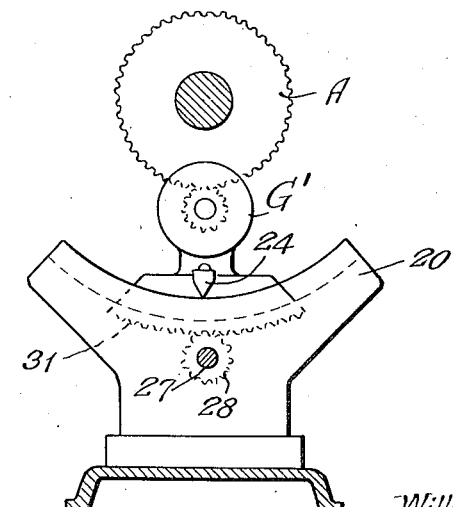

Patented Oct. 2, 1928.

1,685,964

UNITED STATES PATENT OFFICE.

WILLIAM W. SMITH AND ROBERT W. ERICKSON, OF JERSEY CITY, NEW JERSEY.

ELECTRIC TORSION POWER METER.

Application filed July 22, 1924. Serial No. 727,472.

This invention relates to a basically novel apparatus for measuring torque or power transmitted by shafts or similar machine elements and aims to provide means whereby either the torsion or horsepower of a revolving power member can be instantaneously measured and indicated. The apparatus provides means whereby the twist or torsional deflection of a rotating shaft which is transmitting power, may be measured by suitable calibration of a recording instrument forming part of the apparatus. The measurement may be indicated in degrees of torsion or angular deflection between two points on the shaft, and by taking into consideration the speed or revolutions per minute of the shaft the meter may be calibrated in units of power such as horsepower, horsepower hours, kilowatt hours or other units in which time as well as force is the element.

While not limited thereto the apparatus is of particular value on shipboard as it enables the chief engineer or other officers to quickly ascertain the power being delivered to the propeller shaft at any instant or to show the total number of horsepower hours or other units of power used for a given trip or during any desired period. Heretofore, to learn such facts engineers or officers on shipboard have had to resort to calculation which involve taking the meter readings of shaft revolutions, etc. This takes time and interferes with other duties and the result is that frequently the engineer is not fully informed concerning the power performance of his vessel.

Our invention provides means for overcoming these difficulties and enables the engineer as well as other officers to determine at a glance at all times just how much power is being used to propel the ship or exactly what deflection the power shaft is being subjected to.

Embodiments of the invention are illustrated in the accompanying drawings in which Fig. 1 illustrates diagrammatically one form of our improved apparatus;

Fig. 2 is a diagrammatic view illustrating the alternative apparatus;

Fig. 3 illustrates a modification;

Fig. 4 is a diagrammatic view showing the elements of a piece of apparatus shown in Fig. 3;

Fig. 11 is a view illstrating a modification;

Fig. 12 is a section on line 12—12 of Fig. 11.

Figure 5:
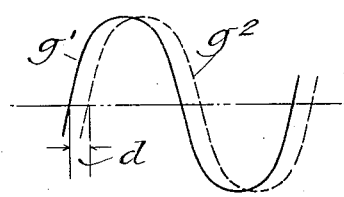
Figs. 5 and 6 are diagrams graphically showing the phase relations between currents generated by portions of the apparatus forming part of the meter.

The apparatus is based on the principle that the twisting moment or torsion in a shaft transmitting power is proportional to the amount of torque transmitted. We provide means spaced snufficiently far apart on the shaft so that the deflection thereof can be recorded by the use of electrical devices to be presently described.

For measuring the magnitude of twist or torsion on the shaft between two given points, we provide means adjacent each point for generating an electric current and carry the two currents to suitable meters or other apparatus which is so designed that the phase relations of such currents can be determined. Our apparatus is so designed that the displacement in phase of the two currents thus generated is proportional to the angular twist of the shaft. Now inasmuch as the angular twist in the shaft is proportional to the torque transmitted and the phase displacement in the currents produced is proportional to the torsion of the shaft, it follows that by a suitably calibrated meter for measuring the phase relations of the two currents generated, we can readily indicate the twist or torsion in the shaft under various operating loads.

The current producing devices driven by the power shaft at different points may take different forms. In Figs. 1 and 2 we have shown generators $G^1$ and $G^2$ for producing these currents and in Fig. 7 we have illustrated an alternative piece of apparatus which can be used as a substitute for the generators.

Referring first to Fig. 1, A and B represent driving members which are secured to the power shaft at a suitable distance from one another. These members are identical and as shown in these figures are driving gears which mesh with pinions carried on the armature shafts of the generators $G^1$ and $G^2$. The field coils of the generators are excited by means of a direct current of electricity furnished from a suitable source of power such as indicated diagrammatically by the battery B. The generator $G^1$ sends a current through a coil $C^1$ the current passing by way of circuit $c^1$. Similarly, the generator $G^2$ sends a current through a coil $C^2$ through the circuit $c^2$. The coils $C^1$ and $C^2$ act on a movable core $C^3$ which is connected by a link $C^4$ with the arm of a pointer P which moves over a scale S. This scale is so calibrated that it gives a direct reading in the units of the measurement required. The phase relations of the currents generated by $G^1$ and $G^2$ is dependent upon the angular change in the members A and B which in turn is dependent on the angular change or deflection in the shaft. At zero torque the currents produced by the generators $G^1$ and $G^2$ are either in the same phase or in phases directly opposite to one another. However, when the shaft is subjected to torsional strain in transmitting power, the phase of the current produced by one generator will be displaced with respect to the phase of the other current an amount proportional to the torsional deflection of the shaft. This phase displacement will cause a corresponding movement of the pointer P which can be read on a calibrated scale S.

Instead of leading two separate circuits to the meter from which the reading of torsion or power is obtained, we may secure the reading by carrying the current from the generators $G^1$ and $G^2$ to a transformer as indicated at T in Fig. 2 wherein the two primary windings $t^1$ and $t^2$ are mounted on one leg of the transformer and the secondary winding $t^3$ is mounted on the other leg and connected by means of wires $T^3$ with a meter $T^4$ which is similar in construction to a known type of volt meter. The exciting currents sent through the coils $T^1$ and $T^2$ will set up in the coil $T^3$ a current which is the resultant of these two currents and the value of this current indicated on $T^4$ will be proportional to the phase displacement of the two currents passed through the coils $t^1$ and $t^2$. The scale on the meter will be calibrated to give a reading which is proportional to the phase displacement of the two currents and therefore also proportional to the torsion or angular twist in the shaft transmitting power.

Figure 6:
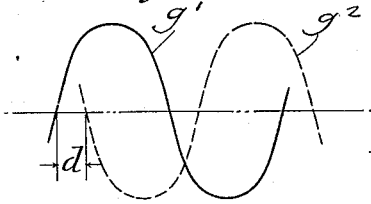

Figs. 5 and 6 graphically illustrate the phase displacement of currents set up by the generators $G^1$ and $G^2$. In Fig. 5, the curve $g^1$ represents the current produced by the generator $G^1$ and the dotted curve $g^2$ that produced by generator $G^2$. In this figure the instantaneous values of current are plotted as ordinates and the values of time or motion are plotted as abscissæ. At zero torque of the power shaft the curves $g^1$ and $g^2$ will be superposed one on the other the generators being so designed and adjusted that under this condition the currents set up thereby will be in absolute phase or synchronism. However, when the shaft is transmitting power and a force is applied as indicated, for example at P in Fig. 1, against a resistance at the end of the shaft indicated at R, one end of the shaft will slightly twist with respect to the other and therefore one generator will lead the other and thereby set up a current out of phase with that set up by the other. This phase displacement is indicated by the distance marked $d$ in Fig. 5. This distance, of course, is proportional to the angular twist set up in the shaft. This characteristic difference is indicated by the various types of meters and similar apparatus herein described all of which are responsive to the phase displacements of currents set up by different current producing members located at different points on the power shaft or other member transmitting the torque.

Of course, instead of having the generators set to produce currents in absolute phase or synchronism at zero torque the generators may be set to produce currents in opposition as illustrated in Fig. 6 wherein $g^1$ and $g^2$ illustrate respectively the currents set up by the generators $G^1$ and $G^2$ and in which the phase displacement is indicated by the distance $d$. Or it will be appreciated that instead of having the generators initially set to operate in phase or direct opposition the displacement may be determined from other angles the idea being that each generator will set up the same kind of current and the displacement may be reckoned from any chosen point in the characteristic curve showing the value of the current. And while throughout this description for convenience of illustration, we have referred to current value it is to be understood that the displacement may be reckoned from variations in phase of the E. M. F. in substantially the same manner.

In Figs. 3 and 4, we have illustrated means whereby the actual curves representing the current value will be shown. In these figures instead of a meter we have shown a double oscillograph O of known construction which is arranged to show the curves $g^1$ and $g^2$ corresponding to the current values set up by the generators $G^1$ and $G^2$. The mechanism of the oscillograph for tracing one curve is shown in a diagrammatic manner in Fig. 4 in which $a$ is an arc light which projects a beam of light through a lens $l$ to the minute mirror on a galvanometer movement R. From this mirror the beam is reflected through a lens $l^2$ to a mirror E which is oscillated synchronously in a plane perpendicular to the plane of oscillation of the galvanometer mirror. From the mirror E the beam of light is focused on a screen W where the point of light traces a curve corresponding to the value of current sent through the galvanometer R. The galvanometer indicates the value of the current and the mirror E deflecting the beam perpendicular to the galvanometer movement indicates the time or cycle. The shutter V closes on the return stroke of the mirror and is operated in synchronism with the cycles of current sent through the galvanometer G. The shutter and mirror E must be moved in synchronism or at the same frequency as the cycles of current and this may be accomplished by operating the same by means of a flexible shaft F as shown in Fig. 3 or by means of a separate synchronous motor operated from either circuit $c^1$ or $c^2$. The oscillograph is preferably of double construction so that the curves representing the current values of both the generators $G^1$ and $G^2$ are produced simultaneously so that the phase displacement of the currents may be visually observed.

Figure 8:
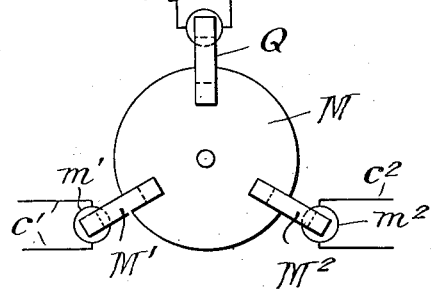
Figs. 8 and 9 are respectively plan and front elevations of an alternative form of meter.
Figure 9:
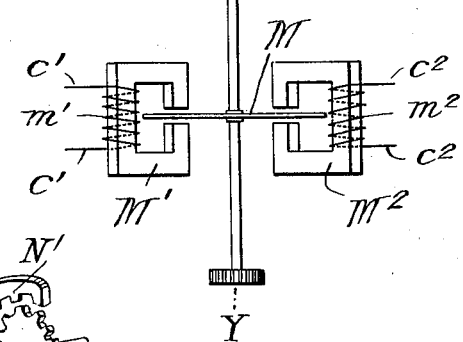
Figure 7A:
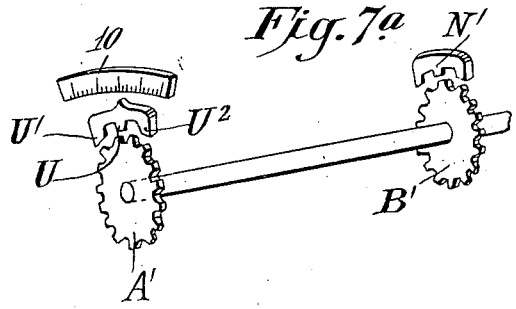

In Figs. 8 and 9 is shown a type of meter adapted to be used in connection with the generators $G^1$ and $G^2$ forming part of our apparatus. This meter operates on the induction principle and includes a metal disc M free to turn on the axis XY. Laminated iron cores $M^1$ and $M^2$ straddle the disc and are provided with coils $m^1$ and $m^2$ which are connected in the circuits $c^1$ and $c^2$ leading to the generators $G^1$ and $G^2$. In operation the currents in the coils $m^1$ and $m^2$ magnetize the cores $M^1$ and $M^2$ with a flux that is constantly changing. This changing flux generates a corresponding current in the disc M which circulates partly under the poles of the opposite core. When the currents in the coils $m^1$ and $m^2$ are in phase (or in opposition) there is no reaction, but when the phase of these currents are displaced with respect to one another, a torque is set up in the disc M which causes it to turn. The shaft of this disc may be connected with a pointer moving over a suitable scale or may be connected as shown to a train of gears which connect with movable dials whereby each would turn over a long period of time so as to permit readings to be taken in terms, for example, of horsepower hours, kilowatt hours or other suitable units. It is advantageous to construct this meter in such way that any change in the exciting current supplies to the circuit $c$ for the generators $G^1$ and $G^2$ will be automatically compensated since a change in the current of circuit $c$ will cause a corresponding change (subject to conditions) in the currents produced by the generators $G^1$ and $G^2$. To compensate for such changes this meter is preferably provided with a third magnetic yoke Q similar to the yokes $M^1$ and $M^2$ except that it is wound with a coil $Q^1$ adapted to be excited by the current flowing in the circuit $c$ which excites the field windings of the generators $G^1$ and $G^2$. This yoke Q will have a constant flux and will generate a current in the disc M whenever the same is moved and will, therefore, have a retarding effect which will increase with the increase of flux or current in the circuit $c$. Therefore should the current in the circuit $c$ (of Fig. 1) be increased or decreased it would have the effect of increasing or decreasing the voltage of the circuits $c^1$ and $c^2$ but with the compensating yoke Q of Fig. 8 this increase or decrease will increase or decrease the retarding effect thus automatically compensating for fluctuations of the torque or speed of the disc M.

Figure 7:
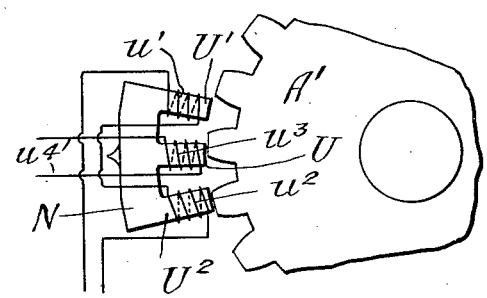
Figs. 7 and 7a are diagrammatic details showing current producing means which may be used alternatively for the generators shown in Figs. 1 and 2.

In the foregoing description we have referred to generators $G^1$ and $G^2$ producing the currents whose displacement in phase is recorded on various types of meters whereby the twist or torque in the power shaft may be determined. Instead of using generators or small dynamos for producing these currents, we may use other forms of current producing devices. For example, as illustrated in Fig. 7 and Fig. 7$^a$ we have shown toothed discs $A^1$ and $B^1$ which are adapted to be substituted for the gear A shown for example in Fig. 1 secured to the power shaft. We will also use a similar disc $B^1$ in place of the gear B shown in Fig. 1. The discs $A^1$ and $B^1$ will coact with magnetic yokes N and $N^1$ provided with three poles U, $U^1$ and $U^2$. Each yoke is preferably made of laminated magnetic material and the poles $U^1$ and $U^2$ are magnetized at opposite polarities and in some cases may be permanent magnets although we prefer to provide the poles $U^1$ and $U^2$ with windings $u^1$ and $u^2$ which are connected with one another by suitable wires leading to the circuit C shown for example in Fig. 1.

The yoke N is normally stationary and is secured in proximity to the toothed disc $A^1$ and is so proportioned with respect to the spacing of the teeth on the disc that the teeth on the disc in revolving, alternately form a magnetic path for poles $U^1$ and $U^2$ through the pole U. Therefore, the pole U will have an alternating or changing magnetic flux sent through it and consequently will generate a changing or alternating current in the coil $u^3$ which is in the circuit $c^1$. This coil is connected with wires $u^4$ which correspond to the wires forming circuit $c^1$ leading from the generator $G^1$ of Fig. 1. There will be a similar yoke N and a toothed disc located at the end of the shaft to take the place of disc gear B and generator $G^2$. These discs, yokes and coils will set up currents of similar wave form but the phase relations of such currents will be displaced in proportion to the twist in the shaft in the same manner as the currents set up by the generators $G^1$ and $G^2$ are displaced as above described. Thus the angular position of the yokes N with respect to the discs A may be adjusted so as to bring the phase relations of the two currents into synchronism or into opposition. When the shaft is deflected these currents will be displaced as to phase and this displacement will be proportional to the deflection as above described. It is clear that by measuring the angular movement (on the scale 10 in Fig. 7ª) of the member N required to bring the phase relations of the current either into exact synchronism or opposition as the case may be, the deflection of the shaft may be ascertained. This is also true in the case of the generators $G^1$ and $G^2$, it being possible to adjust these generators angularly and by measuring the angular movement of one generator with respect to the other to bring the currents into opposition or into exact phase, the deflection of the shaft may also be determined.

Fig. 11 illustrates the manner of mounting the generators $G^1$ and $G^2$ in such way that their angular displacement may be readily measured. As shown, generator $G^2$ is fixed to a rigid base 21 and generator $G^1$ is mounted for movement in the direction concentric with the axis of the power transmitting shaft whose torque is to be measured. For example, the generator $G^1$ is provided with an arcuate dovetailed base 30 which slidingly engages an arcuate base 20 having scale markings 22 thereon for indicating the angle of movement of the generator. The generator will be provided with a suitable pointer 24. A hand wheel 26 carried by a shaft 27 having a pinion 28 thereon meshing with a rack portion 31 formed on the underside of the dovetailed base 30 will serve as means for moving the generator $G^1$ relatively to the generator $G^2$.

It is thus clear that the deflection or amount of angular twist can be determined in several ways as above described. First, by direct reading of electrical instruments which are responsive to changes in phase relation of the two currents produced by generators at different points on a shaft. Second, by direct observation of current curves produced by direct visual indication produced by an oscillograph arranged to show the phase characteristics of currents produced by generators on different points of the power shaft. Third, by direct measurement of the movement of either generator on the shaft required to bring the relationship of two currents into phase, opposition, or other chosen value.

From the foregoing, it is clear that the apparatus described will clearly enable a reading to be taken of the twist or angular deflection of a shaft which is transmitting power. If the revolutions per unit of time of the shaft are taken into account we have all the elements necessary to obtain the horsepower being transmitted by the shaft. The formula for determining the horsepower is as follows: H. P.=D×R×C, where H. P. is horsepower; D the meter reading in degrees of angular deflection (if calibrated to read directly in degrees) of the shaft; R the revolutions per minute of the shaft; C a constant for each particular shaft which is obtained by the formula:

$$\frac{2\pi \times T}{33000}$$

where T=the torsional moment in pounds at one foot radius necessary to give a shaft deflection of one degree. This formula may be further condensed by calibrating each meter to the particular shaft to which it is applied, in which case the formula becomes H. P.=R×M where H. P.=the horsepower.
R  =the revolutions per minute.
M  =the meter reading.

If the revolutions of the shaft is a constant quantity it may be taken into account when calibrating the meter in which case R may be eliminated, which reduces the formula to H. P.=M. The meters herein described automatically take into account the revolutions of the shaft per unit of time since the frequency of the actuating circuits $c^1$ and $c^2$ vary with the variations in the shaft revolutions. Inasmuch as H. P. is a value which takes into account torque and speed and the meters herein described are responsive to changes in both torque and speed, it follows that they integrate these two values and give a direct reading of the horsepower being transmitted by a shaft or similar power transmitting unit.

Figure 10:
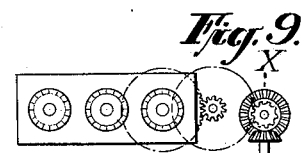
Fig. 10 is a view illustrating two adjacent portions of a shaft coupled to one another by a yielding member whose torsion or deflection can be measured by the apparatus embodying our invention.

While we have described the apparatus with particular reference to measuring the deflection and power transmitted by a shaft, it will be appreciated that the apparatus can be used in other connections and we have diagrammatically shown in Fig. 10 two shaft sections $S^1$ and $S^2$ coupled by a spring $S^3$ or other yielding connection. It will be appreciated that members A and B corresponding to those shown in the other figures may be connected to the shafts $S^1$ and $S^2$ so as to measure the deflection of the yielding member $S^3$ or the power transmitted by these elements.

The various power meters herein described being responsive to electric current, variations can be conveniently located at different stations on board ship by merely installing the meter at the desired location and carrying the wiring to the current generators connected to the power shaft. Usually there will be several meters, one on the working platform of the engine room, one on the navigating bridge, others in the chief engineer's, or other officer's cabins, one in the chart room, and so forth. These, of course, will all show the same reading, hence the power performance of the prime mover can be ascertained at any time in various locations. The power meter will usually be installed as part of a general system including meters and instruments which will indicate the direction of rotation of the power shaft, the revolutions per minute (R. P. M.) of said shaft, the torque of said shaft, the speed of the vessel through the water as derived from the R. P. M. of the propeller and the distance travelled in knots or nautical miles as based on the revolutions of the power shaft.

In ships having more than one power or propeller shaft, we may provide a single meter arranged for indicating the total power of a plurality of shafts or may use a separate meter for each shaft and add the readings to obtain the total.

Though we have described the invention with great particularity it is not to be construed that we are limited to the circuit arrangements or meters and various apparatus diagrammatically shown as modifications and substitution of equivalents may be made without departing from the invention as defined in the appended claims.

What we claim is:—

1. An apparatus of the class described comprising means for measuring torsion including two current producing members operatively connected to the member whose torsion is to be measured and an oscillograph for indicating the phase relations between the currents produced by said members whereby the torsion can be determined, said oscillograph being actuated by said currents.

2. An apparatus of the class described comprising means for producing two electric currents whose phase relations are proportional to the torsion of a given member and means operated by said currents for graphically indicating the phase relations of said currents.

3. An apparatus of the class described comprising means for determining the twist or torsional deflection between two points of a shaft including two generators operatively connected with the shaft and means responsive to currents from said generators for making a graph indicating the phase displacement of the currents produced by said generators.

4. An apparatus for measuring and indicating the instantaneous value in units of horsepower being transmitted by a shaft, comprising current producing members operating at a speed proportional to that of the shaft and connected therewith at different points along the shaft and means responsive to the currents produced by said members for indicating the torque transmitted at a given frequency, said means being arranged to give an integrated reading in units of horsepower.

In witness whereof, we have hereunto signed our names.

WILLIAM W. SMITH.
ROBERT W. ERICKSON.